(12) United States Patent
Hunter et al.

(10) Patent No.: US 6,526,731 B1
(45) Date of Patent: Mar. 4, 2003

(54) FORAGE COMPACTING APPARATUS WITH MOISTURE SENSOR

(75) Inventors: Douglas Andrew Hunter, Cochrane (CA); Richard Wayne Littlewood, Sundre (CA)

(73) Assignee: HWD Holdings Ltd., Cochrane (CA)

( * ) Notice: Subject to any disclaimer, the term of this patent is extended or adjusted under 35 U.S.C. 154(b) by 0 days.

(21) Appl. No.: 09/580,480

(22) Filed: May 26, 2000

Related U.S. Application Data

(62) Division of application No. 08/988,848, filed on Dec. 11, 1997, now Pat. No. 6,085,486.

(51) Int. Cl.[7] ............................................. B65B 13/20
(52) U.S. Cl. ......................... 53/529; 53/589; 73/73; 100/17; 100/99
(58) Field of Search ..................... 53/529, 530, 589; 100/17–24, 74, 99; 73/73

(56) References Cited

U.S. PATENT DOCUMENTS

| | | | |
|---|---|---|---|
| 250,135 A | | 11/1881 | Dederick |
| 677,148 A | | 6/1901 | Webb |
| 4,090,440 A | | 5/1978 | Jensen |
| 4,158,994 A | | 6/1979 | Jensen |
| 4,403,542 A | | 9/1983 | Lewis |
| 4,812,741 A | * | 3/1989 | Stowell ................... 73/73 X |
| 4,868,491 A | * | 9/1989 | Black ...................... 73/73 X |
| 4,885,531 A | * | 12/1989 | Stowell ................... 73/73 X |
| 4,918,910 A | * | 4/1990 | Sheehan et al. ......... 100/74 X |
| 4,936,206 A | | 6/1990 | Miles et al. |
| 5,001,974 A | | 3/1991 | Gombos |
| 5,701,723 A | | 12/1997 | Simpson |
| 5,758,479 A | * | 6/1998 | Staheli ................... 100/74 X |

FOREIGN PATENT DOCUMENTS

GB    965906    8/1964

OTHER PUBLICATIONS

Hunterwood Technologies Ltd. brochure. "FC8200 Forage Compactor". Apr./96.

* cited by examiner

*Primary Examiner*—Stephen F. Gerrity
(74) *Attorney, Agent, or Firm*—John Russell Uren

(57) ABSTRACT

A forage compactor for compressing forage or crop into bales of increased crop density for transportation. A crop feed area feeds crop to a conveyor where it is moved to a scale area for proper bale weight. An indexer severs the crop while moving it from the scale area to the compression chamber. The crop is compressed and moved to a strapping chamber where straps are applied to the compressed crop. The bound bale is manipulated as desired at the product handling area downstream from the strapping chamber. The crop is provided with substantially constant stress during compression and moisture sensors in the strapping chamber sense the moisture content of the severed crop within the bale to be bound. The weight of the crop within the compression area may be reduced to reduce machine overloading. Keyway plungers provide reduced side loading on the main ram used for crop compression. The feed inlet area is located on the same side of the compression chamber as the exit chamber to allow for more efficient operation and area utilisation.

1 Claim, 12 Drawing Sheets

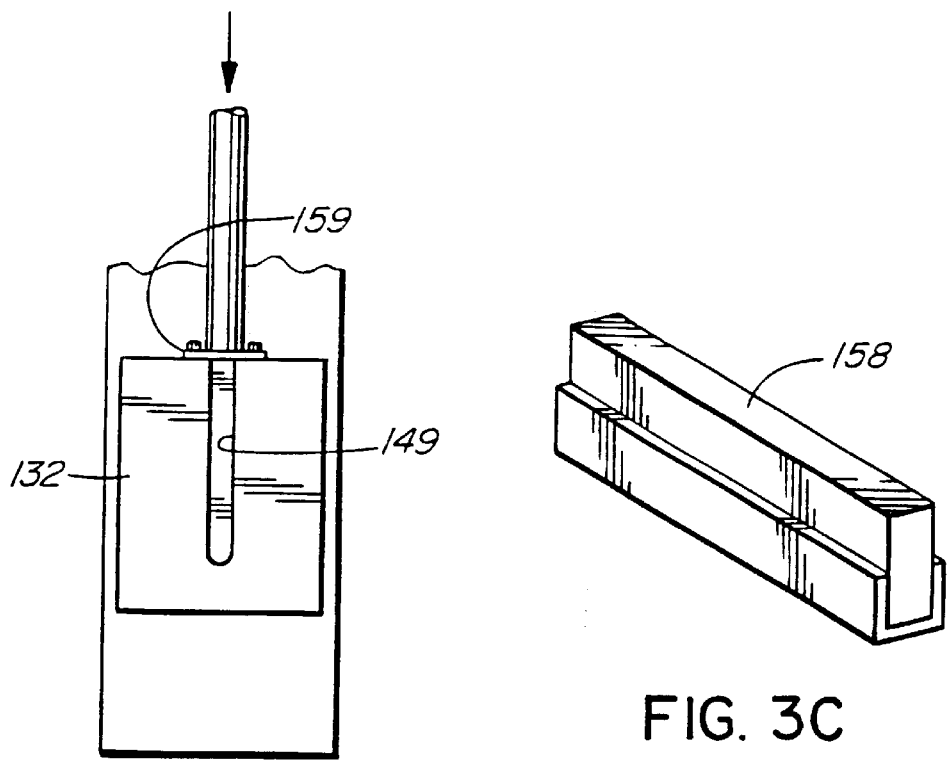
FIG. 3A
FIG. 3C
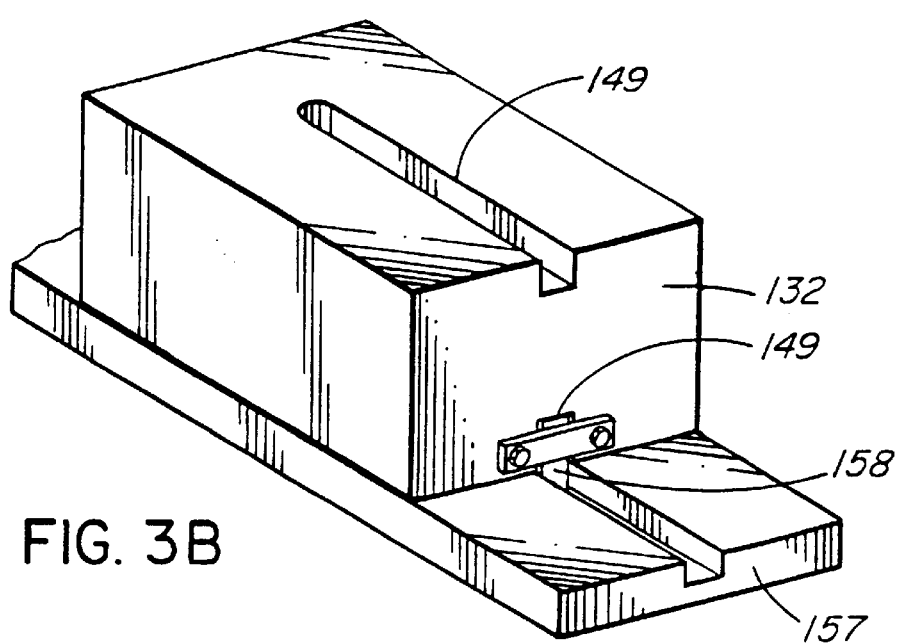
FIG. 3B

FIG. 4D 3
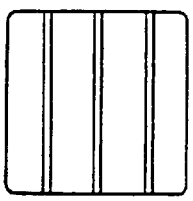
FIG. 4E 4
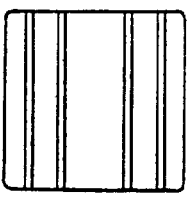
FIG. 4F 5
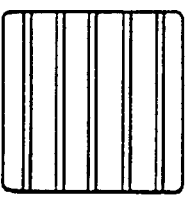
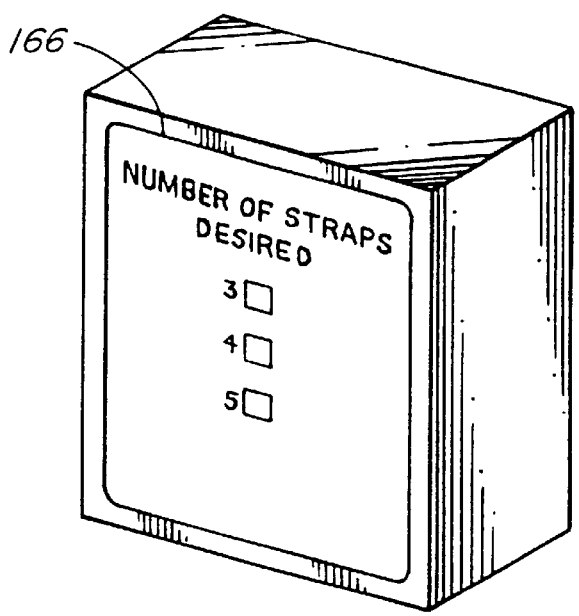
FIG. 4C
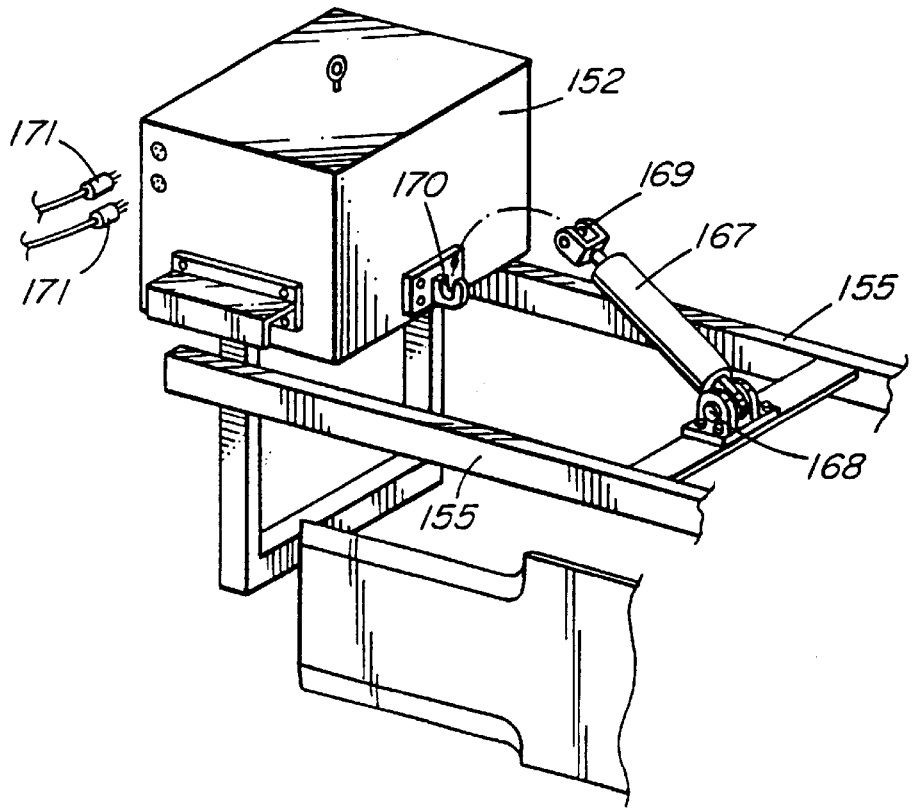
FIG. 4G

FORAGE COMPACTING APPARATUS WITH MOISTURE SENSOR

CROSS-REFERENCE TO RELATED APPLICATION

This application is a division of application Ser. No. 08/988,848 filed Dec. 11, 1997, now issued as U.S. Pat. No. 6,085,486 on Jul. 11, 2000.

INTRODUCTION

This invention relates to a compactor and, more particularly, to a forage compactor which is hydraulically powered and operated and which compresses forage into optimal size bales for container transport.

BACKGROUND OF THE INVENTION

The formation of hay bales is, of course, well known. Such balers are used in agricultural operations in the field to form harvested hay into bales having generally either rectangular or circular dimensions. The bales so formed allow improved handling and storage and have a weight which allows convenient manipulation following their formation. Such bales are typically stored and used in locations relatively close to the harvesting location.

Commercial markets have now been established for forage in locations far removed from where the forage crop is harvested and formed into bales. For example, markets in the Asian and Middle Eastern countries have opened for forage from material harvested in North America and Australia. Thus, the transportation of such forage at a reasonable cost and maintaining such forage in marketable condition during transportation has become an important focus in order to profitably sell such forage.

Forage compactors to recompact standard hay bales are known. Such compactors generally act to take standard hay bales, separate the material making up the bales and recompact such material at a density which is much greater than the density of the forage in a standard bale while retaining generally the same dimensions. Thus, the recompacted bale may be shipped utilizing a far more efficient volume of space with an increased quantity of forage making up the bale A typical forage compactor is described in U.S. Pat. 5,001,974 (Gombos) entitled HAY BALE RECOMPACTING SYSTEM. Gombos teaches a compactor having an inlet allowing the crop to enter into a compression chamber where the crop is compressed. Following compression, the crop leaves the compression chamber from an outlet positioned on the opposite side of the compression chamber from the inlet. A strapping operation is disclosed in which straps encircle each bale. The strapping operation takes place following the removal of the forage from the compression chamber.

The Gombos apparatus, however, suffers disadvantages. First an operator must be located on the same side of the compactor as the strapping unit since strapping units are not reliable under the severe operating conditions of the compactor. In order to properly remove twines from the incoming bales, an operator should be located on the inlet side of the compression chamber; that is, near the end of the main compression cylinder where the operator is in proximity to the highly stressed tie rods of the compression cylinder and the hydraulic hoses providing the high pressure hydraulic oil feeding the cylinder. This position is not a preferred operator location because the chances for an accident are increased. Further, being located at this point does not allow the operator to ensure that the scaling of the product is consistent. To overcome the latter problem, yet another operator is needed. The former problem relating to safety considerations remains.

A further disadvantage with Gombos is that the inlet and outlet locations located on opposite sides of the compression chamber necessarily dictate that the plant layout is inefficient. The forage compactor must be centrally located on the plant floor as opposed to being located against a wall, for example, where better overall utilization of floor space area can occur.

SUMMARY OF THE INVENTION

According to one aspect of the invention, there is provided a forage compactor to compress forage into bales comprising a crop inlet area, a scale, a conveyor to convey crop to said scale, an indexer to convey said crop from said scale to a compression chamber, a compress plunger to compress said crop in said compression chamber and an eject plunger to eject said compressed crop from said compression chamber, said compressed crop being ejected from a crop outlet area downstream of said compression chamber, said crop inlet area and said crop outlet area being located on the same side of said conveyor.

According to a further aspect of the invention, there is provided a forage compactor to compress crop within a compression chamber by a compress plunger operable within a compression cylinder, said compactor comprising a plurality of pumps to supply hydraulic fluid to said compression cylinder and being operable to move said compress plunger to a compression position, one of said pumps having a pressure compensator, said pressure compensator being operable to allow said compress plunger to exert a substantially constant pressure on said crop within said compression cylinder for a predetermined time period and a hydraulic fluid relief sensor to relieve said pressure on said crop following said predetermined time period.

According to yet a further aspect of the invention, there is provided a forage compactor for compressing crop into bales within a compression chamber, said compactor further comprising a strapping chamber downstream from said compression chamber, said strapping chamber having a moisture sensor to measure the moisture of said crop of said compressed bale within said strapping chamber.

According to yet a further aspect of the invention, there is provided a forage compactor for compacting crop into compressed bales, said compressed bales including bales exiting a crop outlet area at a first predetermined time and previous bales exiting said crop outlet area at a second predetermined time, said second predetermined time being subsequent to said first predetermined time, a container for holding a predetermined number of said compressed bales, said compactor including a scale for weighing crop, a compression chamber for compressing said weighed crop into said previous and subsequent bales, a crop outlet area downstream of said compression chamber for receiving said previous and subsequent bales and a controller for determining the individual weight of said bales comprising said total number of bales, said controller being operable to increase the weight of said subsequent bales if said previous bales are underweight.

According to still yet a further aspect of the invention, there is provided a forage compactor to compress crop into bales comprising a compression chamber defined by a compression cylinder and a compress plunger reciprocal within said compression cylinder, at least one keyway in said compress plunger, at least one keyway in said compression cylinder, and a key extending between said keyways.

According to still yet a further aspect of the invention, there is provided a forage compactor to compress crop comprising a compression chamber, a compress plunger to compress crop within said compression chamber, a strapping chamber downstream of said compression chamber to strap said compressed crop, said strapping chamber being defined by platens holding said compressed crop on opposite sides of said compressed crop, a strapping assembly mounted for reciprocal movement along said platens, said strapping assembly being operable to install at least one of a plurality of straps on said compressed crop within said platens.

According to yet a further aspect of the invention, there is provided a forage compactor for compressing crop into bales in a compression chamber, said compactor comprising a crop outlet area to receive crop ejected from said compression chamber in the form of a compressed bale, a crop holding station to hold said bale and a strapping chamber to strap said bale upon movement of said bale from said holding station to said strapping chamber, said bale ejected by said compression chamber being moved to said strapping chamber by a movement length defined by approximately two bales.

According to yet a further aspect of the invention, there is provided a forage compactor to compress crop comprising a compression chamber having a wall and an indexer to move said crop into said compression chamber through said wall, said wall and said indexer having complementary knives to sever said crop as said crop moves through said wall into said compression chamber.

According to yet a further aspect of the invention, there is provided a forage compactor to compress crop in a compression chamber comprising a compression chamber, a compression cylinder, a compress plunger movable in said compression cylinder, a plurality of hydraulic pumps to provide fluid pressure to said compression chamber and a controller to detect the power required by said pressure of said fluid within said compression chamber, said controller initiating operation of more of said plurality of hydraulic pumps during relatively low power required by said compression chamber and fewer of said plurality of hydraulic pumps during relatively high power required by said compression chamber.

According to yet a further aspect of the invention, there is provided a forage compactor to compress crop within a compression chamber comprising a compress plunger having a compress stroke and an eject stroke, sensors to determine the position of said compress plunger during said eject stroke, and controllers operable from said sensors to initiate deceleration of said compress plunger during said eject stroke when said plunger reaches a predetermined position.

According to still yet a further aspect of the invention, there is provided a forage compactor to compress crop within a compression chamber, said compactor comprising a plurality of movable components and a controller, said components being movable manually, said controller being operable to prevent interference between said components during said manual movement of said components.

According to still yet a further aspect of the invention, there is provided a forage compactor to compress crop within a compression chamber, said compression chamber having a compression cylinder and a compress plunger movable within said cylinder, said cylinder being supplied with hydraulic fluid under pressure from a manifold, said manifold having inlet and outlet ports, said manifold being connected directly to said compression cylinder, said hydraulic fluid passing directly from at least one of said inlet or outlet ports to said compression cylinder.

According to still yet a further aspect of the invention, there is provided a forage compactor bale configuration system comprising a first elevator to receive a compressed bale, a first rotator to rotate said compressed bale, a first slider to move said compressed bale in a non-rotated position from said first elevator, a rolldown plate to receive said compressed bale and being operable to rotate said compressed bale, a second slider to move said compressed bale in a non-rotated position from said rolldown plate and a second rotator to rotate said compressed bale from said rolldown plate.

According to still yet a further aspect of the invention, there is provided a forage compactor comprising a compression chamber defined by walls, a top and a bottom, said top and bottom being connected by removable bolted connections.

BRIEF DESCRIPTION OF THE SEVERAL VIEWS OF THE DRAWINGS

Specific embodiments of the invention will now be described, by way of example only, with the use of drawings in which:

FIG. 3A is a diagrammatic plan view of the compress plunger particularly illustrating one of the two keyways used to guide the plunger in the compress cylinder;

FIG. 3B is a diagrammatic isometric partial view of the compress plunger particular illustrating the keyway and the key extending the compress plunger and the compression cylinder;

FIG. 3C is a diagrammatic isometric view of the key particularly illustrating the low friction coating;

FIG. 4C is a diagrammatic view of the screen used by the operator and the representation of the strapped and compressed bale obtained with each strap configuration;

FIG. 4D is a diagrammatic side view of the strapper assembly particularly illustrating the components used for removal and installation of the strapper assembly;

DESCRIPTION OF SPECIFIC EMBODIMENT

Figure 1A:
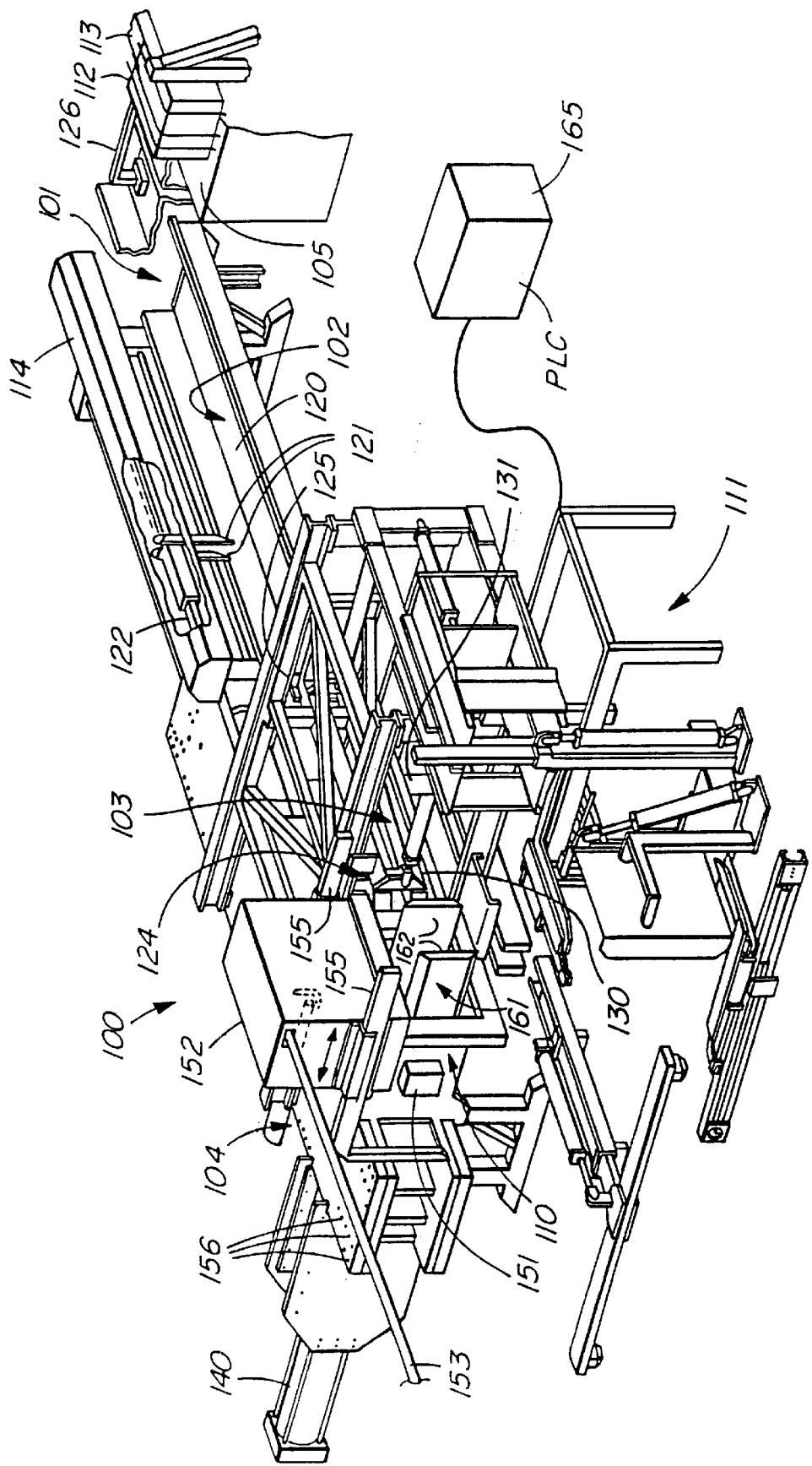
FIG. 1A is a diagrammatic isometric view of the forage compactor according to the invention.
Figure 1B:
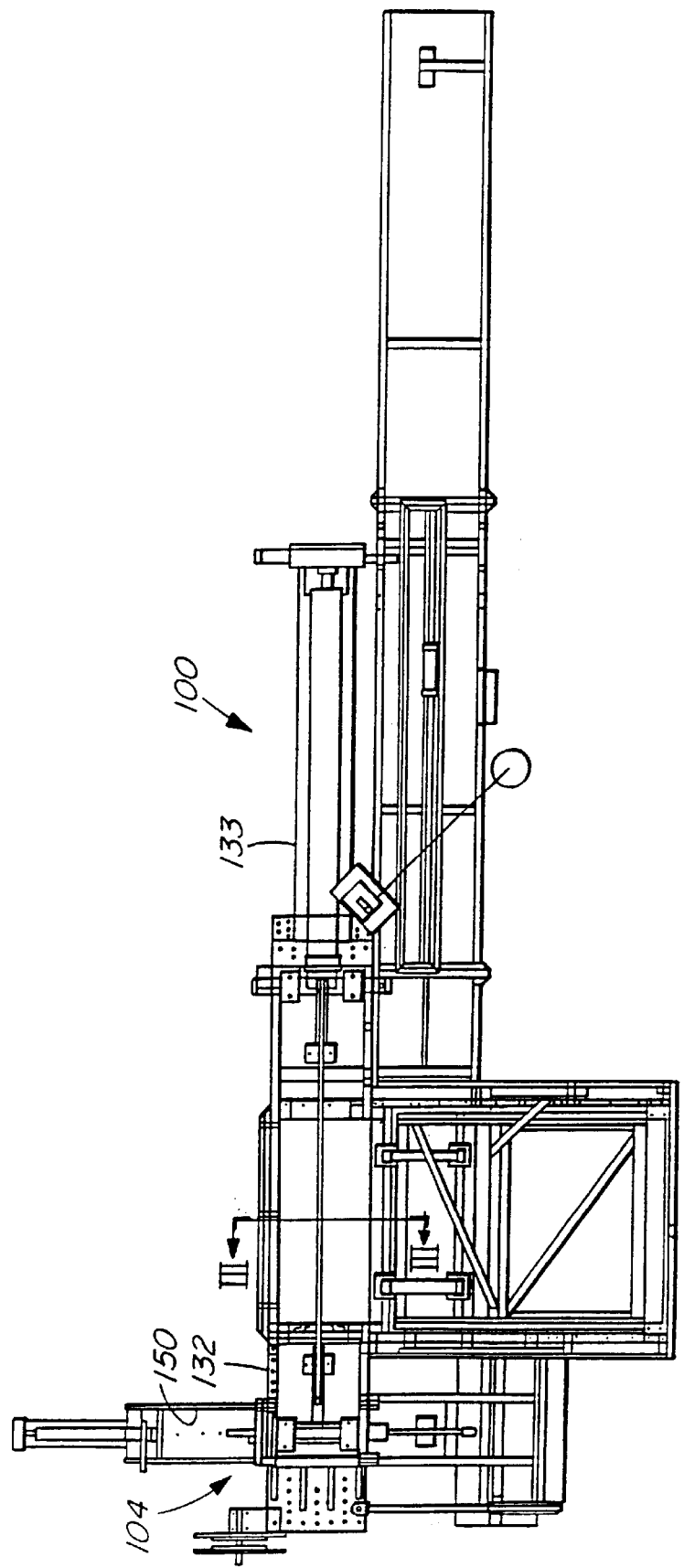
FIG. 1B is a diagrammatic plan view of the forage compactor of FIG. 1.
Figure 1C:
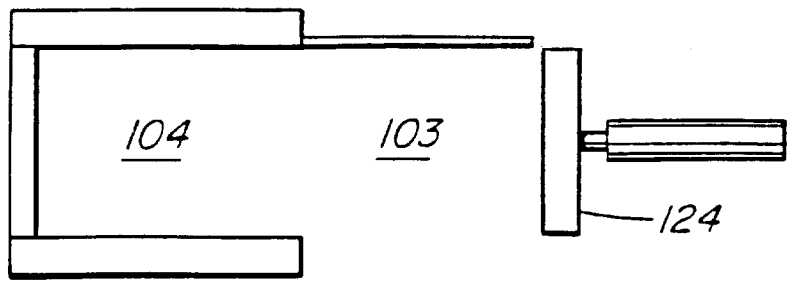
FIGS. 1C–1E are diagrammatic plan views of the bale movement and compression operation.
Figure 1D:
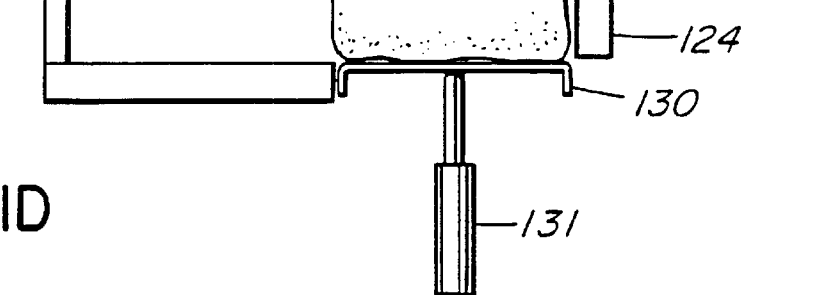
Figure 1E:
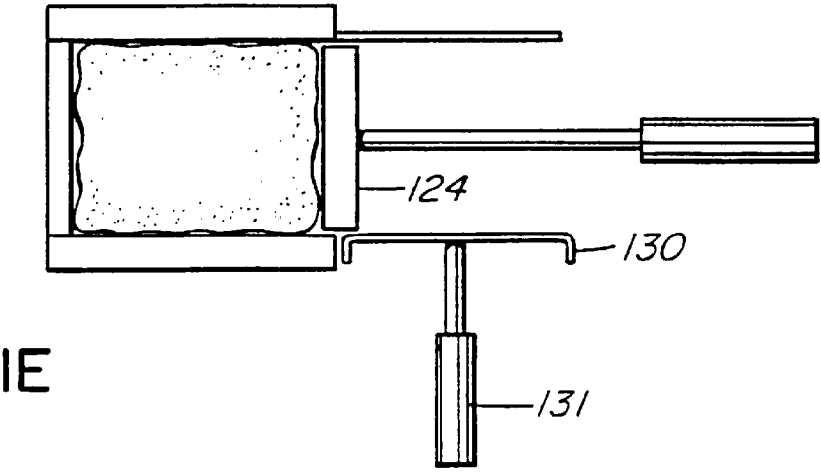

Referring now to the drawings, a forage compactor according to the invention is generally illustrated at 100 in FIGS. 1A and 1B. It comprises a feed table generally illustrated at 105, an inlet area generally illustrated at 101 for the uncompressed hay or forage, a "bull pen" or buffer area generally illustrated at 102 for the uncompressed detwined forage, a scale pan area generally illustrated at 103 which is located downstream from the "bull pen" area 102, a compression chamber generally illustrated at 104 sidewise located from the scale pan area 103, a strapping chamber generally illustrated at 110 sidewise located from the compression chamber 104 and a product handling area generally illustrated at 111, all of which will be described and illustrated hereafter.

A plurality of hay bales 112 of the known generally rectangular variety are positioned on the feed table 105 by means of a variety of well known bale delivery devices. The twine (not illustrated) maintaining the bales in an assembled form is manually cut and removed from the bales 112 following the positioning of the bales 112 on the feed table 105. The bales 112 are also tested for appropriate moisture content.

The crop is conveyed to the conveyor pan 120 upstream of the intake indexer 114 by feed table indexer 113. The crop on the conveyor pan 120 is then conveyed to the bullpen area 102 located under the intake indexer 114 by the cross-conveyor indexer 126.

The bales 112 comprising forage or crop are in their generally loosened, detwined configuration and are guided by the sides of the conveyor pan 120. The intake indexer 114 includes two forage movement fingers 121 which extend downwardly from a chain drive 122 located over the crop on the conveyor 120. The fingers 121 move the crop towards the scale pan 103 and are pivotally mounted so that they may rotate forwardly or clockwise as viewed from the side when they are moving backwards over the crop so as not to interfere with the crop on the conveyor 120 when returning from the scale pan area 103.

Intake indexer 114 moves a predetermined amount of crop 112 to the scale pan area 103. The intake indexer 114 is coordinated with the weight of the crop moved into the scale pan area 103 so that when the load cells (not illustrated) connected to the floor 130 of the scale pan 103 measure the appropriate amount of crop 112 that has entered the scale pan area 103, movement of the crop into the scale pan area 103 by the intake indexer 114 will terminate. The movement of the reciprocating intake indexer 114 is such that it will not interfere with the load indexer 124 when the crop is moved into the compression chamber area 104.

The floor 130 within the scale pan area 103 is mounted on hydraulic cylinders 131 (only one of which is illustrated). Following the weighing operation, the floor 130 is moved upwardly by the hydraulic cylinders 131 in order to compress the crop within the scale pan area 103 so as to optimize the package size of the compressed bales 141. The floor 130 will remain in its compression position during the movement of the load indexer 124 as it moves the crop from the scale pan area 103 into the compression chamber 104.

Figure 8:
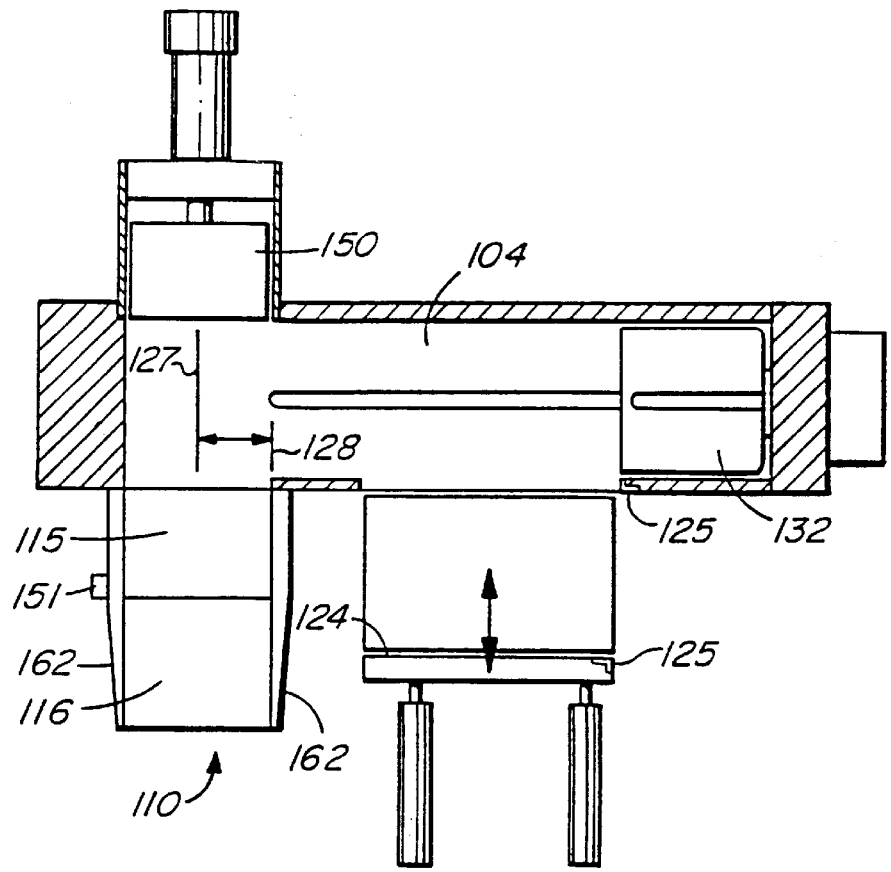
FIG. 8 is a diagrammatic plan partial sectional view of the compression chamber particularly illustrating the overkill and eject positions of the main plunger and with a wall of the compression chamber being formed by the load indexer.

The load indexer 124 severs the crop being moved into the compression chamber 104 by way of knives 125 (only one of which is illustrated) which are located so as to sever crop material by their relative movement (FIG. 8) while the load indexer 124 moves horizontally relative to the wall of the compression chamber 104. The load indexer 124 compresses the crop within the compression chamber 104 and maintains its position during compression by the compress plunger 132.

The compression chamber 104 is expandable to increase its size, if desired, so as to increase the size of a compressed bale. A plurality of bolts 156 maintain the compression chamber 104 in its assembled position. If the compression chamber 104 is desired to be expanded so as to create a bale of greater size, the bolts 156 are removed and shims are used to enlarge the compression chamber 104. Other components will also necessarily be required to be replaced or modified such as the compression plunger 132 and the eject plunger 150 so as to appropriately fit the enlarged compression chamber 104.

Figure 7:
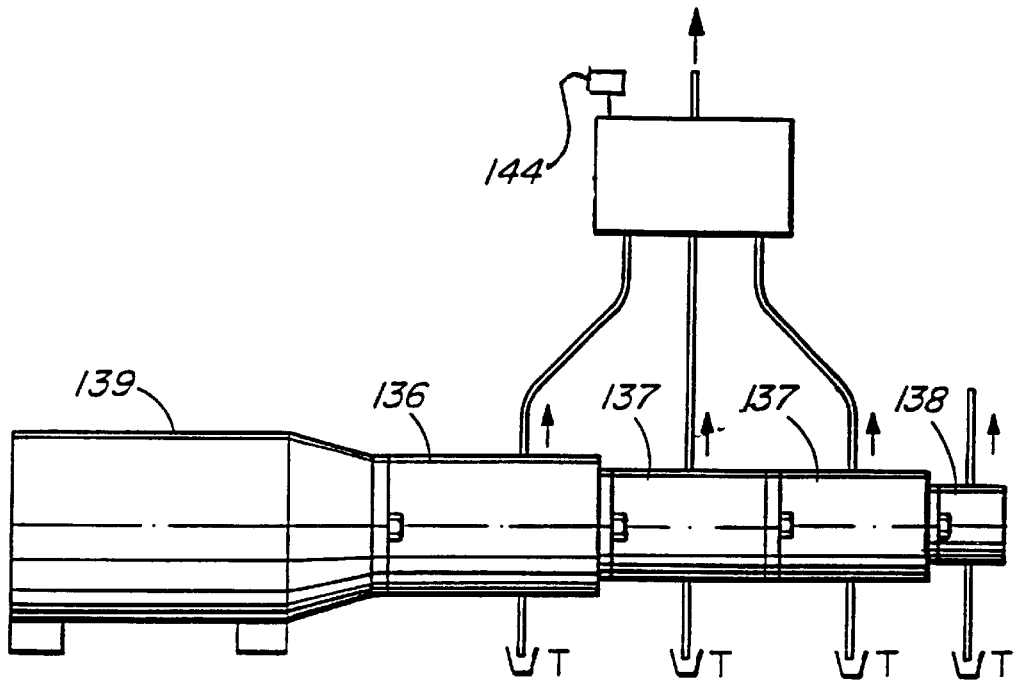
FIG. 7 is a diagrammatic plan view of the stackable hydraulic pumps used to maintain desired hydraulic pressure in the various systems used in the forage compactor according to the invention.

Compress plunger 132 within hydraulic cylinder 133 provides the necessary force to compress the forage within the compression chamber 104. The compress plunger 132 is hydraulically operated by a plurality of stacked hydraulic pumps generally illustrated at 135 (FIG. 7).

The hydraulic pumps 135 comprise a high pressure hydraulic pump 136, two medium pressure pumps 137 and an auxiliary pump 138, the latter being used to power the auxiliary devices and the high pressure and medium pressure pumps 136, 137 being used to provide fluid to the compress plunger 132 and eject plunger 150.

When there is little resistance being offered to the compress plunger 132 as is the case when the stroke of the compress plunger 132 is just commencing, all three pumps 136, 137 will be operating so the compress plunger 132 is moving relatively quickly. As the resistance within the compression chamber 104 builds, however, the pumps 137 are shifted out or terminated, pump 137 located next to the auxiliary pump 138 being the first to terminate operation. Shortly thereafter, as horsepower again reaches the setpoint, the medium pressure pump 137 located adjacent the high pressure pump 136 will be shifted out. This is done to limit the power being required to that of the rated power of motor 136 which powers the pumps 135. Thus, the compress plunger 132 will move relatively more slowly as the pressure increases. Finally, only the high pressure pump 136 will be operating and this pump 136 includes a pressure compensator which will reduce the fluid displacement of the pump 136 to near zero at the maximum pressure position as will be described.

Figure 5:
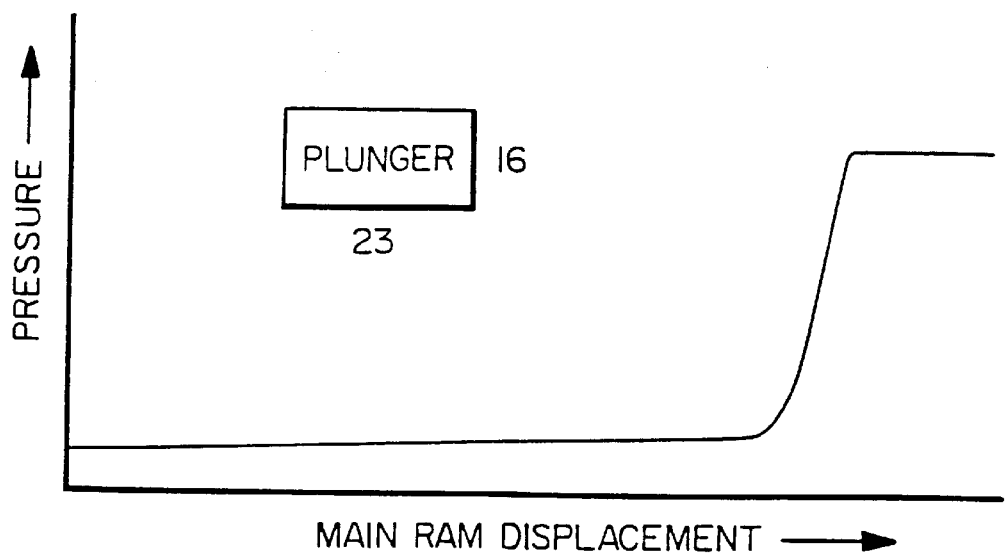
FIG. 5 is a graphical depiction of the pressure in the main hydraulic cylinder as a function of displacement of the main ram within the cylinder.

Pumps 135, including variable displacement pump 142, provide hydraulic fluid to the various hydraulic components of the forage compactor 100. Variable displacement pump 142 has an adjustable swash plate (not illustrated) which allows the compress plunger 132 to maintain a predetermined pressure on the forage within the compression chamber 104 as seen in FIG. 5. When the predetermined pressure is reached during the compression stroke, the pump 136 "swashes" to almost zero fluid displacement thereby maintaining the predetermined pressure on the crop in the compression chamber 104 until a solenoid actuated hydraulic control valve 145 redirects the fluid of the pump 142 back to the reservoir 146 after a predetermined time period. A sensor 144 detects the pressure in main cylinder 133 and a timer within the programmable logic controller ("PLC") provides an appropriate signal to the solenoid actuated hydraulic control valve 145 after the predetermined elapsed time at the predetermined pressure. This will provide pressure relief and the compress plunger 132 will fall back from the overkill position 127 (FIG. 8) to the eject position 128.

Figure 6A:
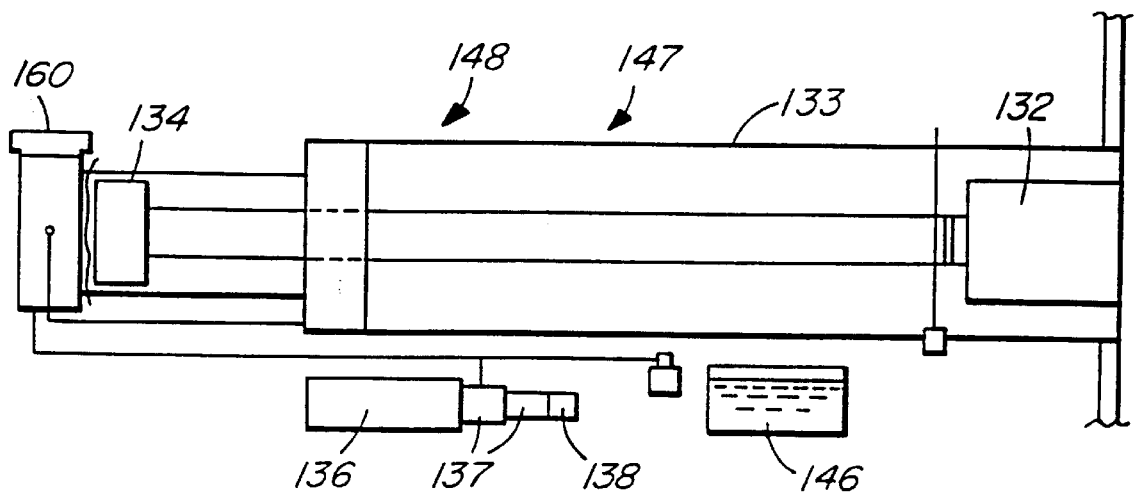
FIG. 6A is a diagrammatic side view of the compress plunger in the compressed position and illustrating the deceleration sensors.
Figure 6B:
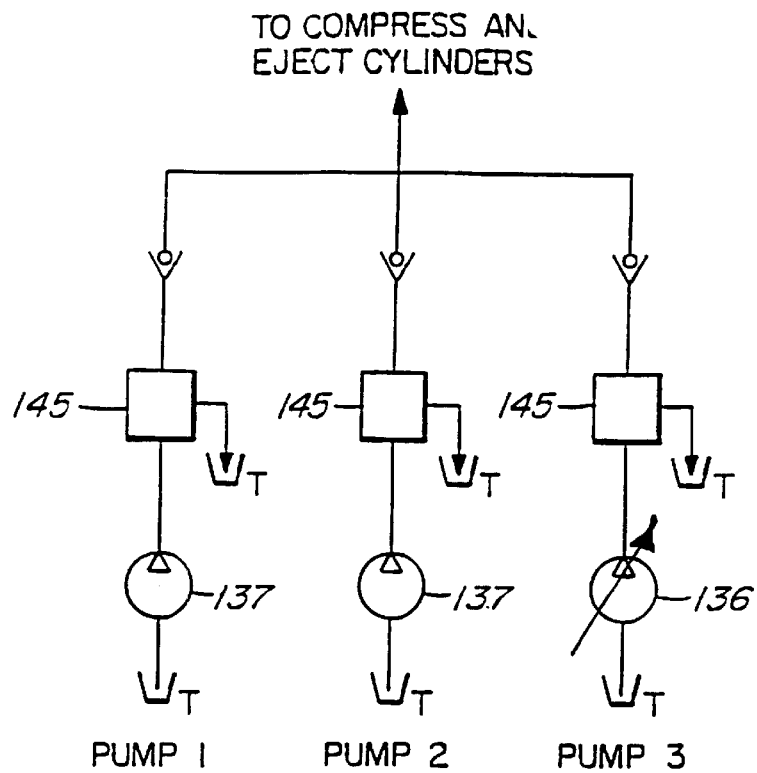
FIG. 6B is a diagrammatic schematic illustrating the fluid flow from the hydraulic pumps used for the compress and eject plungers.

A further control feature is illustrated in FIG. 6. Two sensors in the form of proximity switches 147, 148 are positioned adjacent the path of compress plunger 132. These sensors 147, 148, define the position of compress plunger 132 where, during retract, deceleration is desired to be initiated. When the initial sensor 147 is reached, pump 137 adjacent auxiliary pump 138 will be shifted out. After a predetermined period of time, pump 137 adjacent high pressure pump 136 will be shifted out. It is desirable to terminate operation of the two pumps 137 stepwise for smooth operation. Accordingly, when sensor 148 is reached, last pump 136 is shifted out. This operation is similar for the operation of the load indexer 124.

It will be noted that the use of proximity sensors 147, 148 override the use of the earlier described pressure sensors which likewise produce the step down operation. This is so to prevent any damage to the machine components. Thus, although the pressure is low and not of concern to the operation of motor 136, the pumps 137 will be shifted out to being the deceleration portion of the stroke of compress plunger 132. Hydraulic fluid may also be used to dampen the stroke of compress plunger 132 near the end of the compression stroke.

The high pressure pump 136 (FIG. 6) with its adjustable swash plate allows the compress plunger 132 to compress the crop within the compression chamber 104 until a predetermined pressure level is reached, conveniently 5000 psi as is illustrated in FIG. 5. When this pressure is reached, the compress plunger 132 utilises such pressure to maintain compression on the crop for a predetermined and brief period. The compress plunger 132 then backs off to the eject position 128 (FIG. 8) wherein the eject plunger 140 can subsequently move the crop to the exit location of the compression chamber 104 without damaging the fiber being compressed. This has an advantage in that compressed bales 141 constructed by the pressure of the compress plunger 132 in compression chamber 104 have a more constant density throughout thus creating compressed bales 141 of increased uniform density. This technique has the further advantage that the "spring back" effect of the fiber making up the compressed bales 141 which is obtained with the "constant pressure" technique using the compress plunger 132 and the variable displacement pump 142 is such that the tension in the straps 153 (FIG. 4B) encircling the compressed bales 141 is quite adequate to maintain the compressed bales 141 in their compressed condition throughout the subsequent transportation operation and such tension does not contribute to strap breakage, all as will be described.

Provision is provided for manual operation of the compactor 100. In the event the operator desires to manually operate the compactor 100, the programmable logic controller (PLC) 165 provides for determination of which components are being manually operated and prohibits the operation of any other component which could interfere with the operation of the component being manually operated. For example, if the compress plunger 132 is being operated, the PLC will not allow the operation of the eject plunger 150 when interference could result even if the operator mistakenly attempts to operate the eject plunger 150 during the compression stroke of the compress plunger 132. Likewise, the PLC determines whether a component is being moved by two elements. If that is the case, the PLC will ensure each element completes its individual movement prior to the movement of the other element. For example, in the event the crop is being compressed by both the load indexer 124 and the compress plunger 132, the PLC will require the load indexer 124 to complete its movement prior to operation of the compress plunger 132.

The PLC also provides for automatic continuation of the manual operation until the completion of a cycle in the event the operator wishes to return to automatic operation. Thus, if the operator wishes to return to automatic operation during the compression stroke of compress plunger 132, the PLC will have monitored the manual operation. The automatic operation, suddenly enabled, will dictate that the PLC complete the compression stroke and the remaining steps in the cycle prior to commencing a new cycle. This removes the necessity of requiring the operator to manually return all operating components to their initial operating positions prior to the commencement of the next automatic cycle.

Reference is made to FIGS. 3A and 3B which illustrate the keyways 149 of the compress plunger 132. The keyways 149 extend along a portion of the length of the compress plunger 132 and the top and bottom of the compression chamber 104 for a distance equal to the travel distance of the compress plunger 132. A key 158 (FIG. 3C) of the same general length is inserted into the keyways 149. A retaining strap 159 maintains the key 158 is coated with a low friction material such as TEFLON (Trademark) to assist smooth operation. The key 158 assists in transferring offset or sidewise directed force exerted on the compress plunger 132 to the frame of the compactor 100, such sidewise directed force, for example, arising because of rocks or other generally non-compressible material in the compression chamber 104.

The hydraulic fluid required for operation of the compress plunger 132 is directed by way of a manifold 160 mounted to the end of the compression cylinder 104 opposite from the end in which the actual crop compression takes place. Hydraulic fluid from the pumps 135 enters the manifold 160 and is directed by the manifold 160 to the cylinder 104 when the compression stroke is initiated. Upon compression of the crop by the compress plunger 132, and when it is desired to reverse the flow of hydraulic fluid so as to retract the compress plunger 132, the fluid flow will be reversed such that fluid in the downstream side of the compress plunger 132 will flow to the tank and fluid will be pumped into the upstream side of the compress plunger 132 thereby to assist in plunger return. The mounting of the manifold 160 on the cylinder 104 allows for the elimination of hoses, etc. which are subject to damage and high pressure and also increases the efficiency of the fluid circulation since the exit and inlet passages in both the manifold 160 and compression cylinder 104 are adjacent and in direct communication with each other.

An eject plunger 150 (FIG. 1B) of crop ejector 140 is used to eject the crop from the compression chamber 104 following the removal of the main ram 132 from any interference position within the compression chamber 104. Eject plunger 153 moves the compressed bale 141 into the strapping chamber 110. In this position, moisture sensors 151 located on one or both sides of the strapping chamber 110 sense the moisture on the sides of the newly severed edge of the compressed bale 141 and give a good representative value for the moisture content of the bales 141 because of the severed crop newly exposed to the ambient air. In the event the sensors 151 sense unacceptably high moisture content, it will alter the behaviour of the strapper assembly 152 as will be described.

A compressed bale 141 will remain within the strapping chamber 110 until moved from that position by a subsequent compressed bale 141. The subsequent compressed bale 141, while being moved from the compression chamber 104 to the strapping chamber 110 by eject plunger 150, will move compressed bale 141 previously within the strapping chamber 110 to the area between the platens 162.

The platens 162 are closely associated with the strapping assembly 152 which reciprocates on strapper rails 153 located above strapping chamber 110 as indicated in FIGS. 1 and 4. The strapping 153 is provided at a plurality of locations on the compressed bale 141 about the platens 162 as desired by the operator.

Figure 4A:
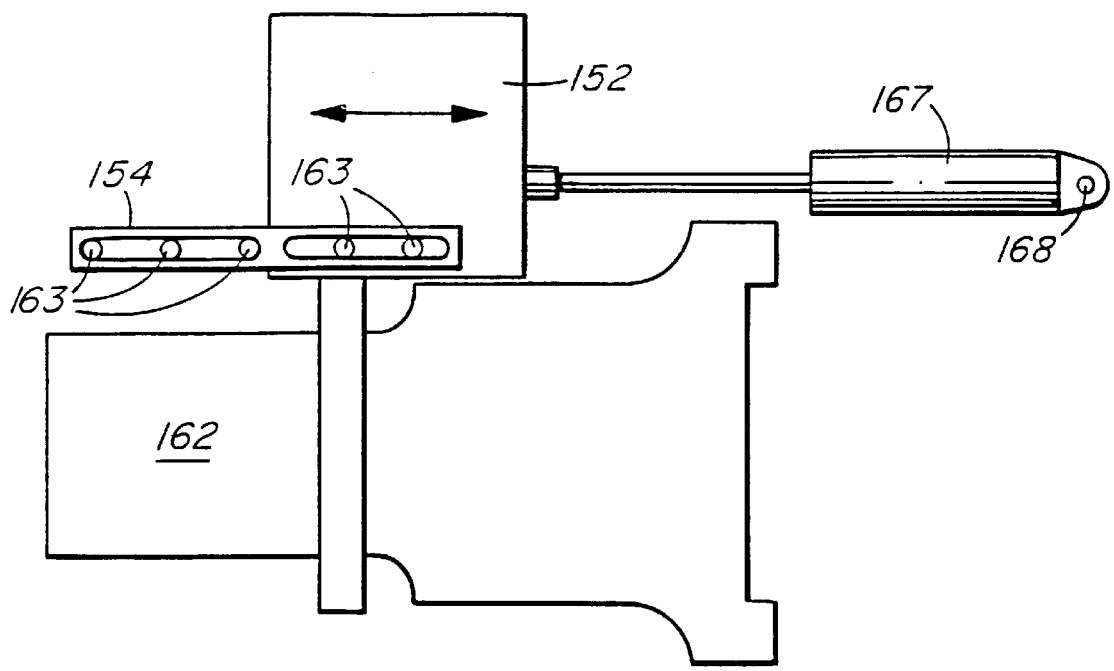
FIG. 4A is a partial diagrammatic side view of the strapper assembly particularly illustrating the indexing plate used to control strap placement.

With reference to FIG. 4A, a plurality of proximity sensors 163 are illustrated, conveniently five(5). Each proximity sensor 163 is mounted on the platens 162 and each is encountered by the strapping assembly 152 as it travels in the directions indicated. A screen 166 is available to the operator. The screen 166 allows the operator to select either three, four or five straps around the crop 141 between the platens 162 in the strapping chamber 110. If, for example, the operator selects four strapping positions, only four (4) of the proximity sensors will be enabled as illustrated. The center proximity sensor will not be enabled. Thus, the strapper assembly 152 interrogates each proximity sensor 163 as it travels to determine whether it is intended to provide a strap 153 at that particular location. When it reaches the center proximity sensor, it will not install a strap 153 and the compressed bale 141 will be ejected with only four (4) straps installed, none at the center position. This particular configuration for the strapping would be useful, for example, when the compressed bales 141 are intended to be severed in half as will be described.

The movement of the strapping assembly 152 is intermittent as it reciprocates; that is, the strapping assembly 152 provides strapping 153 to one bale at the desired locations while travelling one direction. Strapping 153 is applied to the next bale 141 while the strapping assembly is travelling in the opposite direction.

The strapper assembly 152 is mounted for enhanced removal and replacement as viewed in FIG. 4D. The strapper piston 167 is rotatable about axis 168 and a pin 169 is mounted so as to be complementary to a groove 170 on the strapper assembly 152. Quick connect connections 171 are removed from their sockets in the strapper assembly 152, pin 169 is removed from groove 170 and the strapper assembly 152 is easily removed from the rails 155 (FIG. 1) on which the strapper assembly 152 moves. Thus, the breakdown of a strapper assembly 152 will not require extended maintenance with the compactor 100 shut down in order to perform such maintenance.

Figure 4B:
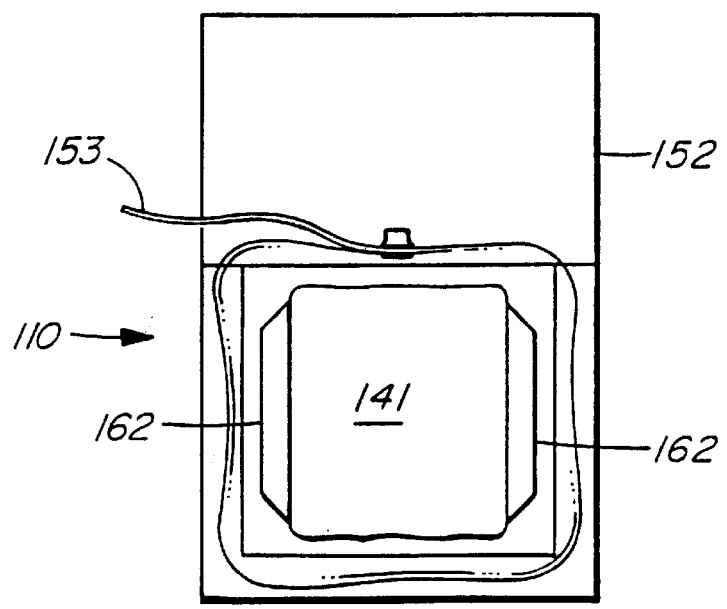
FIG. 4B is a diagrammatic front view of the strapping assembly installing strapping on a compressed bale held between the platens of the forage compactor and the strapping station according to the invention.

The strapping 153 is applied around the outside of the platens 162 within which the compressed bale 141 is held in its compressed position (FIG. 4B). As the bale 141 leaves the platens 162 by reason of a compressed bale 141 being ejected from the compression chamber 104 by the eject cylinder 140, the straps 153 are pulled along with the bale 141 thereby stripping the straps 153 from the platens 151. The spring-back effect of the compressed fiber when free of the restraining force of the platens 162 will provide appropriate tension to the straps 153 thereby to keep the bales 141 in secure assembled condition throughout subsequent transportation.

An indexing plate 154 (FIG. 4A) is mounted to the strapper assembly 152. The indexing plate 154 has a plurality, conveniently five (5), positions 163 thereby to allow any number of straps 153, between one and five, to be placed around the bale 141 being held within the platens 162, the straps 153 being applied to the bale 141 outside the platens 151 as earlier described. Any of the locations 163 is may be selected or eliminated thereby to allow the strapper 152 to omit the application of a strap at such location. Among the factors which dictate the number of straps 153 to be placed on the bale 141, are type of crop and the size and density of the compressed bale 141 and whether it is intended to sever the bale into halves.

If the moisture within the crop is excessive as measured by the moisture sensors 151, the strapping assembly 152 is advised by computer relayed instructions. The strapper 152 will position only a minimum number of straps 153 on the bale 141 to save strapping material and to thereby flag the particular bales 141 containing defective crop due to high moisture content. This will allow the defective bales to be more easily recognized and discarded after their exit from the strapping chamber 110.

The inside area of the platens 162 may be coated with low friction material such as TEFLON (Trademark) material to reduce friction, reduce damage to the product, lower power requirements and to generally facilitate ejection of the bale 141 from the platens 162.

A bagging operation utilising the platen assembly 161 is also contemplated. In the event the customer wishes the crop to be placed within a plastic enclosure or bag, the bag may automatically or manually be placed directly over the platens 162. Thereafter, the strapping 153 may be applied as earlier described or the strapping operation may be eliminated. Likewise, the strapping may be placed around the plastic bagging rather than in direct contact with the platens 162 and the crop. Alternatively, the bag could be positioned over the platens 162 after the straps 153 are applied by the strapping assembly 152.

Figure 2:
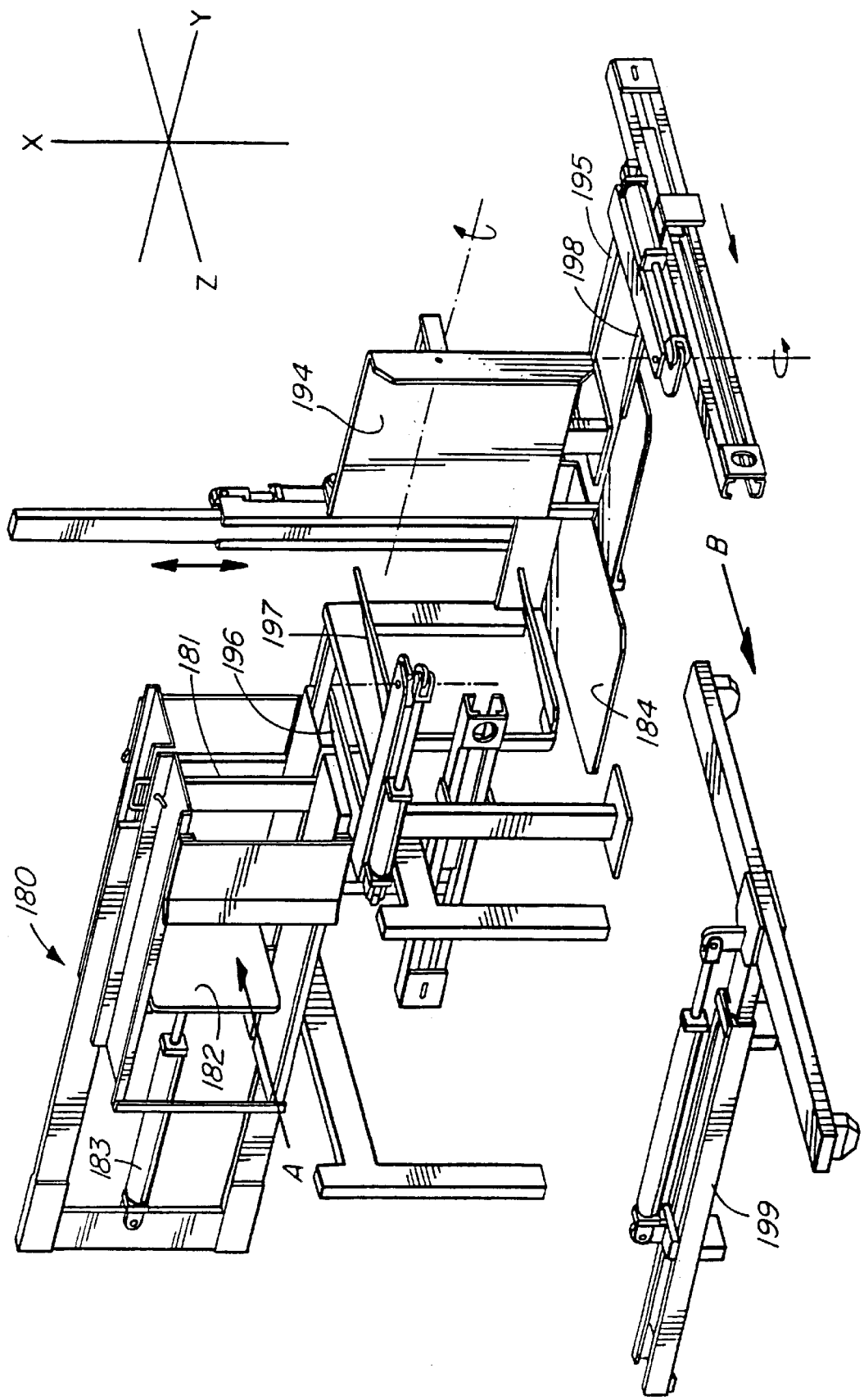
FIG. 2 is a diagrammatic isometric view of the product handling apparatus according to the invention.

Following the strapping/bagging operation, the ejected and compressed bale 141 is processed in the product handling area 111. With reference to FIG. 2, the bale initially enters the cutter box generally illustrated at 180. Cutter box 180 includes a removable knife 181. If it is intended to sever the bale into halves, the knife 181 will be positioned as indicated and the cutter box plate 182, under the influence of piston 183, provides pressure on the bale as it is severed on the knife 181.

The bale will exit the cutter box 180 and move onto the elevator 184 which is in its elevated position. At this point, the bale orientation process will commence.

Figure 11A:
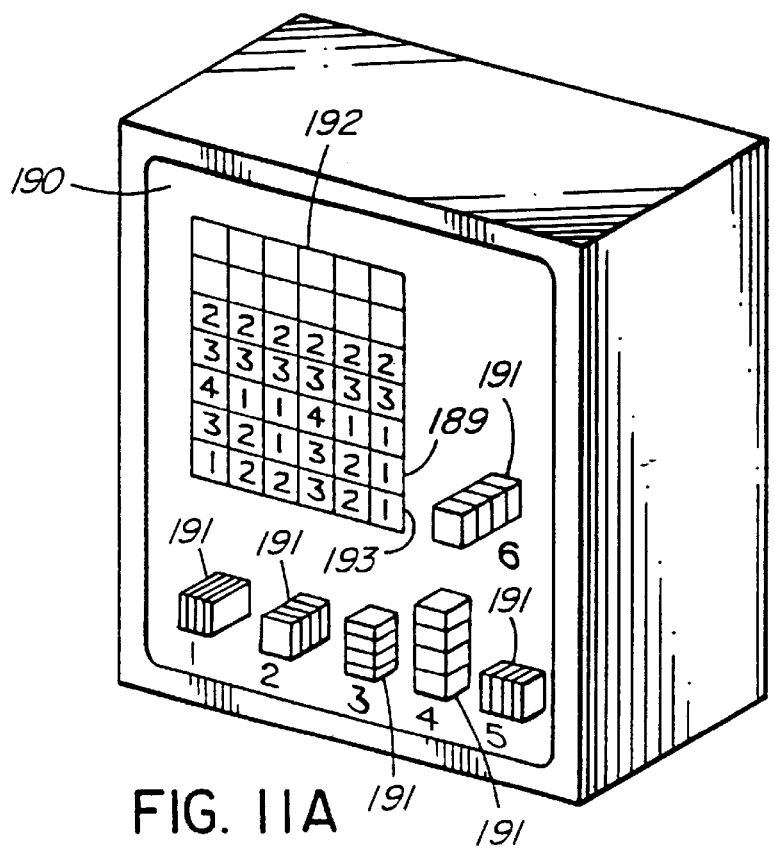
FIGS. 11A and 11B are diagrammatic views of the operator screen used to configure the bales for subsequent handling and the actual orientation of the bales on the floor of the operating room holding the forage compactor for movement by the row pusher.
Figure 11B:
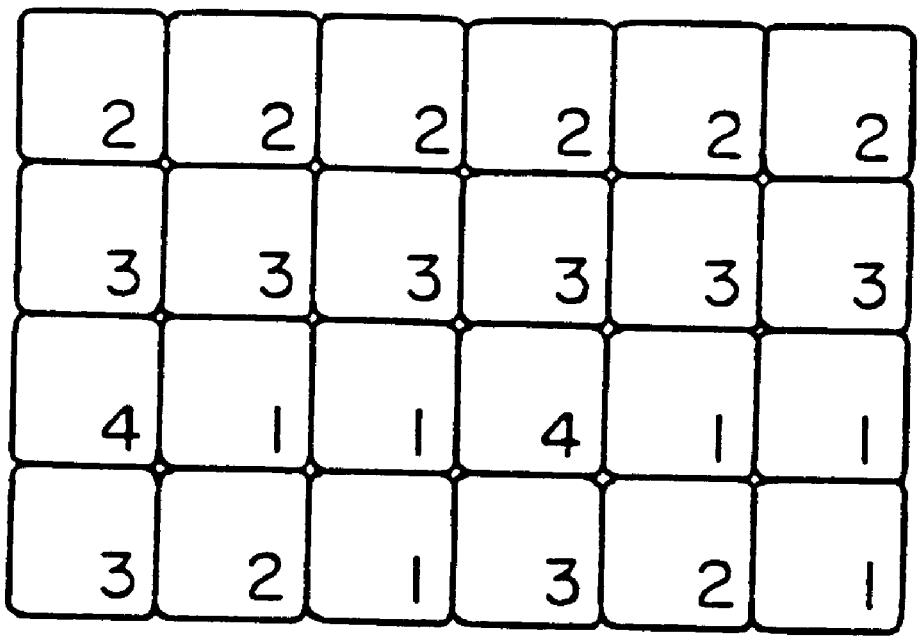
Figure 11B:
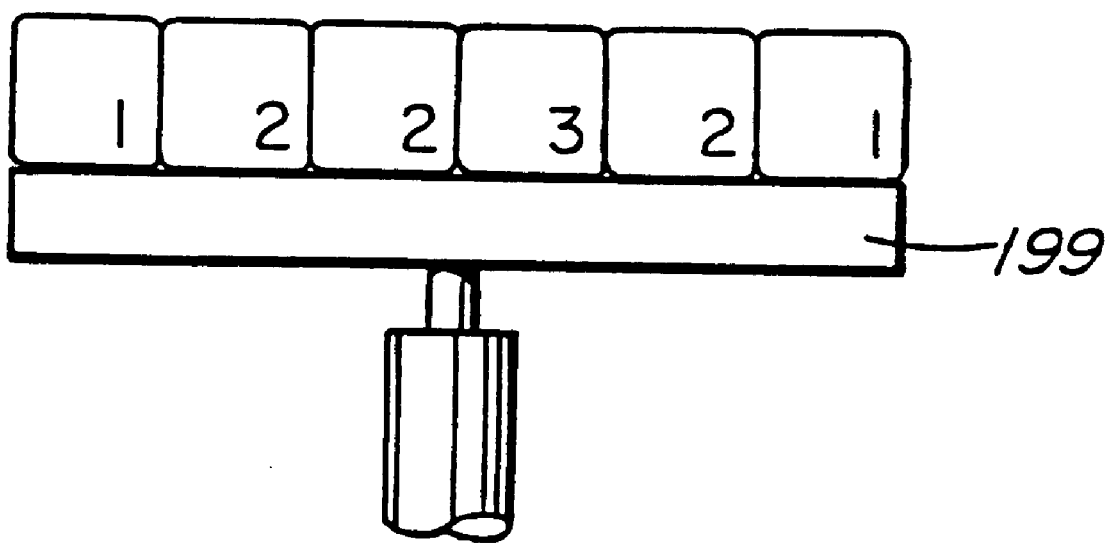

The bale may be oriented in any of six different positions with reference to FIGS. 11A and 11B. The operators screen 190 will have the six (6) possible positions 191 of the bale illustrated at the bottom of the screen 190 by way of icons. The operator will select the configuration of the bale desired by touching the appropriate icon 191 on the screen 190. This will transfer the desired orientation to the central area 192 of the screen 190 and will be illustrated as the first of the bales in a row which will be of the desired number of bales. The procedure proceeds for each bale illustrated in the first row 193 until the desired number of bales in the row 193 is reached at which time the procedure will proceed for the second row 194 and so on until the desired number of rows is completed with the desired number of bales in each row. This will produce the orientation of the bales as illustrated in FIG. 11B on the floor of the operating room in which the compactor is located.

The desired orientation of the bale is then provided by computer input to the product handling apparatuses downstream of the cutter box 180, namely the elevator 184, the roll down pan 194 and the rotator 195. For the bale to be oriented in any of the six (6) possible positions, it must be allowed to rotate about any or all of three (3) axes, namely the x, y and z axes as illustrated in FIG. 2. Each of the orientation processes is described below.

To obtain a final bale configuration where there are no rotations desired, i.e., the bale will remain in the same orientation as when it departs from the cutter box 180, the bale is initially conveyed to elevator 184 by cutter box plate 182. Elevator 184 lowers and slider 197 extends to move the bale into the range of slider 198. Slider 198 extends and the bale is moved in indicated direction B to its final oriented position before subsequent movement to the bale made by the row pusher 199.

If it is desired to obtain a final position for the bale in which the bale rotates about the "x" axis as viewed in FIG. 2, the elevator 184 carrying the bale will lower and slider 197 will move the bale to a position within rotator 195. Rotator 195 will rotate the bale about the "x" axis and move it in direction B. Slider 98 will advance it to its final oriented position.

If it is desired to obtain a final position where the bale is rotated about the "y" axis, the bale is removed from the cutter box 180 by the cutter box plate 182. It is then advanced by slider 197 onto roll down pan 194 which is in the horizontal position. Roll down pan 194 rotates about the "y" axis and the lowered bale is moved by slider 198 to its final oriented position.

If it is desired to rotate the bale about the "z" axis as viewed in FIG. 2, rotator 196 will move the bale to roll down 194 which will rotate and lower the bale. Rotator 195 will then rotate the bale and slider 198 will advance it to its final oriented position.

If it is desired to rotate the bale about both the "z" and "x" axes, the rotator 196 will rotate the bale onto the roll down pan 194 which will rotate and lower the bale. Slider 198 will move the bale into its final oriented position.

If it desired to have rotation about the "z" and "y" axes, slider 197 will move the bale to the roll down pan 194 where it will rotate about the "y" axis. Rotator 195 will rotate the bale. Slider 198 will advance it to its final oriented position.

The row pusher 199 will move each row as it is deposited from the product handling area so as to receive the next row. When the desired number of rows is formed, a forklift using a squeeze attachment will lift the rows formed and place them at a desired location for further processing such as shrink wrap fitting and the like. The bales are then deposited into a known shipping container for transport to its eventual destination.

Software is provided for enabling the shipping container to carry the maximum amount of weight in compressed bales. The maximum weight which can be carried by the container is entered into the PLC together with the maximum number of bales known to fit into the container. This will allow the PLC to calculate the desired weight of each bale to make up the maximum amount of weight carried by container. For example, in the event portions of the crop are difficult to compress without exceeding operating parameters of the compactor such as fluid pressure and the like, with the result that the bales formed are lighter than usual, the PLC will attempt to increase the amount of weight in subsequent bales if the crop becomes easier to compress.

Thus, the system will allow the operator to create a desired bale configuration with bales of varying weights to load the shipping container in the most efficient manner.

Operation

In operation, a plurality of ordinary hay bales 112, will be continuously fed into the cross conveyor pan 120 from the feed table 105 by the feed table indexer 113. While on the feed table 105, the bales 112 are tested for moisture content and detwined. The crop from the bales 112 is moved along the conveyor pan 120 by the cross conveyor indexer 126 to the bullpen area 102. The crop is moved into the scale pan area 103 by the feed fingers 121 of the intake indexer 114.

Within the scale pan area 103, the crop is weighed to ensure the appropriate quantity is present in order to form bales 141 of the desired weight of crop and to ensure the compression chamber 104 is not overloaded. When the correct quantity of hay in the scale pan area 103 is reached, the scale pan lifts and the load indexer 122 moves against the crop on the scale pan 103 and moves it into the compression area 104. The crop is severed by knife surfaces 125 between the load indexer 122 and the housing of the compression chamber 104 while it is being moved by the load indexer 122. The load indexer 122 reaches a furthermost position within the compression chamber 104 and forms a wall (FIG. 8) for the compression chamber 104 during the compression step.

As the crop is compressed within the compression chamber 104 by the compress plunger 132, and as the power required by the compression operation reaches a predetermined set point, the hydraulic pumps will drop off until only the high pressure pump 136 remains. When the high pressure pump 136 reaches its own pressure set point, conveniently 5000 psi., the swash plate will swash to near zero as earlier set forth. The pressure on the crop is maintained for a predetermined time period whereupon the compress plunger 132 will retract to the eject position.

The compressed crop within the compression chamber 104 is ejected by crop ejector 140 into the strapping assembly 152 where it is measured for moisture by the moisture sensors 151 and where it assumes a "dead" or inactive status pending another compression operation.

Following a subsequent compression operation, the "dead" bale 141 is moved by a compressed bale ejected from the compression chamber 104 to the platen assembly 161 where it assumes a position between the platens 162. The strapping assembly 152 will move on rails 155 and apply strapping 153 to the platens 162 at the desired locations on the platens 162 according to the strapping locations 163 (FIG. 4A) selected by the operator. When a second compressed bale 141 is ejected from the compression chamber 104, the bale 141 being held between the platens 162 will be ejected with the strapping 153 being pulled off the platens 162.

The compressed and strapped bale 141 moves to the cutter box 180 where it is severed into halves, if desired. It then moves to the product handling area 111 where it is oriented as desired and placed in rows, as desired. When the desired number of rows is reached, forklift squeeze will lift the bales and move them to the container or to a shrink wrap area where shrink wrap packaging is applied.

Figure 9:
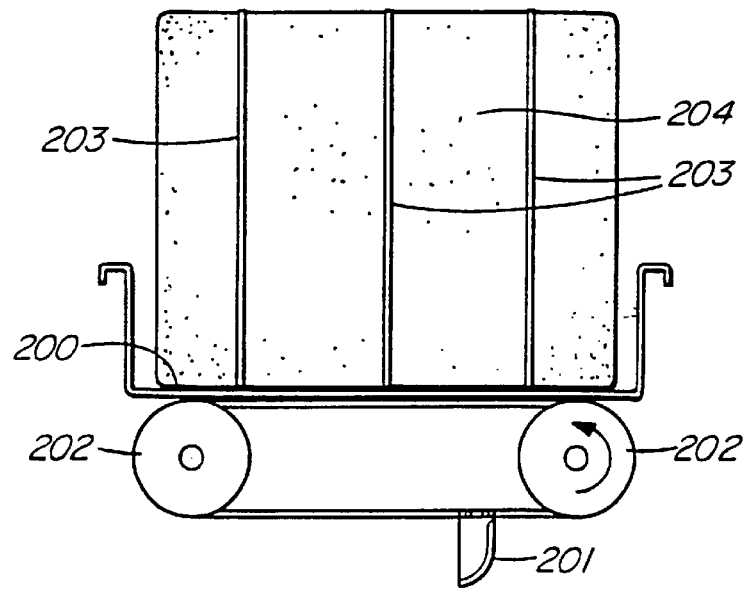
FIG. 9 is a diagrammatic side view of a rotating knife assembly used to cut the twine binding the bales being fed to the forage compactor according to the invention.
Figure 10:
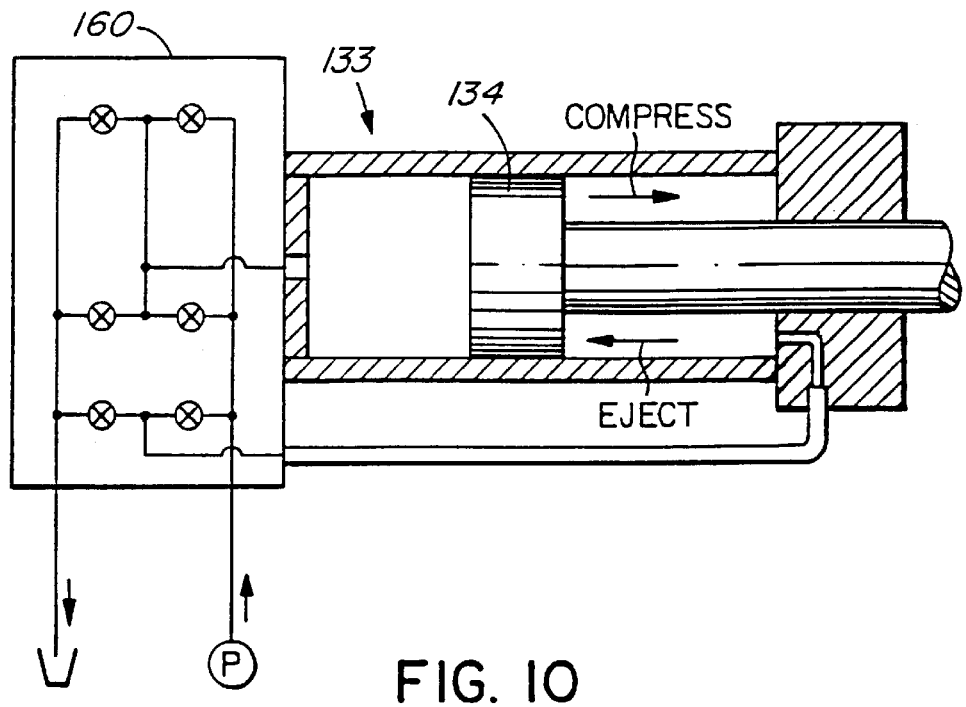
FIG. 10 is a diagrammatic side sectional view of the manifold located in contact with and on the end of the compression cylinder which carries the compress plunger.

It is contemplated that the manual steps of introducing the ordinary bales to the feed table, breaking the twine binding the bales initially introduced to the machine and moving the bales to the scale area could be replaced with an automatic twine removing apparatus and conveyor system which would convey the crop directly to the scale area. For example and with reference to FIG. 9, a rotating knife 201 could be mounted beneath the conveyor surface 200. As the knife 201 rotates about the pulleys 202, the knife 201 will sever the twin 203 which binds the hay bales 204.

While specific embodiments of the invention have been described, such descriptions are for the purpose of illustration only and should not be construed as limiting the scope of the invention as defined in accordance with the accompanying claims.

We claim:

1. Forage compactor for compressing crop and forming bales within a compression chamber, said forage compactor comprising said compression chamber and a strapping chamber downstream from said compression chamber with a moisture sensor within said strapping chamber to measure the moisture of said compressed crop within said strapping chamber, said moisture sensor producing a signal which signal is forwarded to said strapping chamber when said moisture sensor senses high moisture content of said compressed crop within said strapping chamber prior to strapping said compressed crop within said strapping chamber.

* * * * *